(12) United States Patent
Lee et al.

(10) Patent No.: US 11,181,777 B2
(45) Date of Patent: Nov. 23, 2021

(54) BACKLIGHT UNIT AND DISPLAY DEVICE USING THE SAME

(71) Applicant: LG Display Co., Ltd., Seoul (KR)

(72) Inventors: RokHee Lee, Seoul (KR); Hyunmin Park, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/100,145

(22) Filed: Nov. 20, 2020

(65) Prior Publication Data

US 2021/0165280 A1    Jun. 3, 2021

(30) Foreign Application Priority Data

Nov. 29, 2019    (KR) .......................... 10-2019-0157218

(51) Int. Cl.
*G02F 1/13357* (2006.01)
*G02F 1/1335* (2006.01)

(52) U.S. Cl.
CPC .. *G02F 1/133611* (2013.01); *G02F 1/133603* (2013.01); *G02F 1/133605* (2013.01); *G02F 1/133606* (2013.01); *G02F 1/133614* (2021.01)

(58) Field of Classification Search
None
See application file for complete search history.

(56) References Cited

U.S. PATENT DOCUMENTS

| | | | |
|---|---|---|---|
| 11,037,912 B1 * | 6/2021 | Meitl | H01L 25/0753 |
| 11,067,841 B2 * | 7/2021 | Kubota | G02F 1/13471 |
| 2019/0324327 A1 * | 10/2019 | Moon | G02F 1/133608 |
| 2020/0183234 A1 * | 6/2020 | Kim | G02F 1/133611 |
| 2020/0355348 A1 * | 11/2020 | Cheng | F21K 9/64 |
| 2021/0003889 A1 * | 1/2021 | Kim | G02F 1/133611 |
| 2021/0033926 A1 * | 2/2021 | Lim | G02B 5/26 |
| 2021/0165280 A1 * | 6/2021 | Lee | G02F 1/133603 |

\* cited by examiner

*Primary Examiner* — Britt D Hanley
(74) *Attorney, Agent, or Firm* — Seed IP Law Group LLP

(57) ABSTRACT

Embodiments of the present disclosure provides with a backlight unit and a display device with the backlight unit including a plurality of light emitting elements disposed on a substrate, a first reflector disposed on the substrate and including a plurality of holes, one of the plurality of light emitting elements being disposed in each hole, a light conversion sheet disposed on the substrate and having a light conversion pattern disposed at a position overlapping the light emitting element, and a phosphor sheet having a first phosphor disposed on the substrate, wherein a size of first light emitting elements disposed on the edge of the substrate among the plurality of light emitting elements is larger than size of second light emitting elements disposed in the center of the substrate.

20 Claims, 22 Drawing Sheets

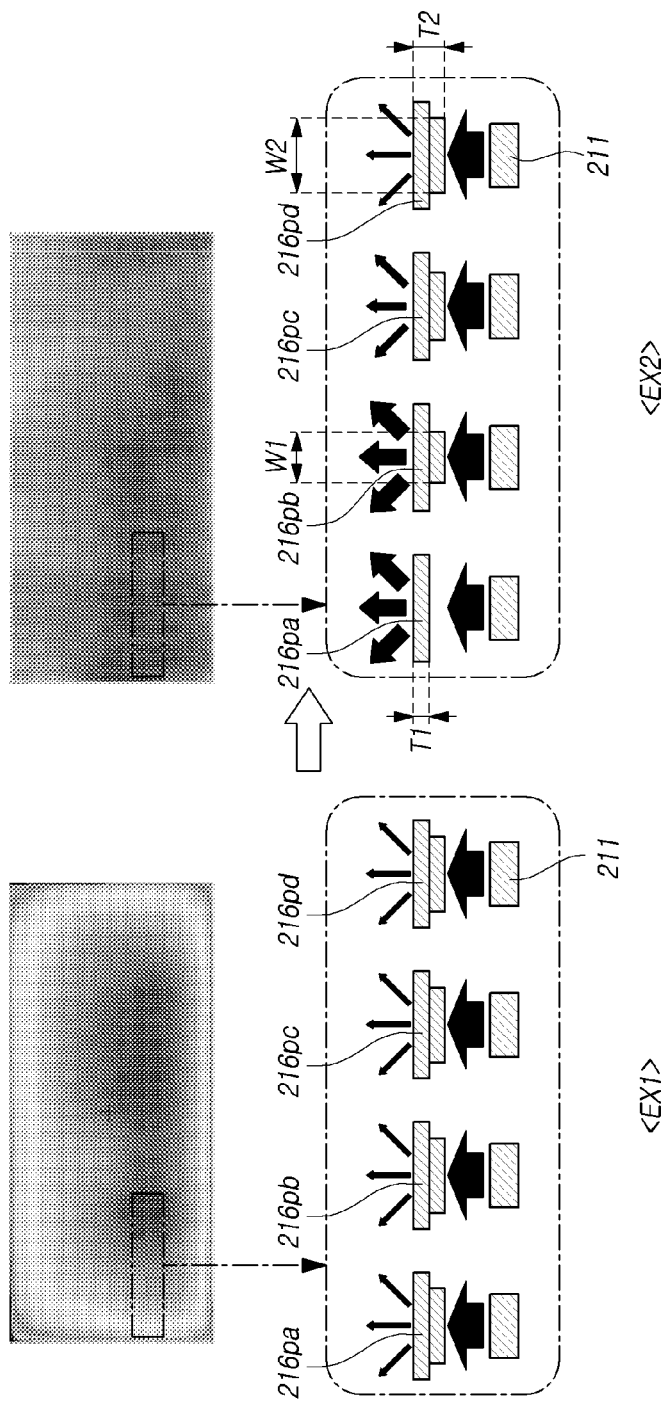

BACKLIGHT UNIT AND DISPLAY DEVICE USING THE SAME

CROSS-REFERENCE TO RELATED APPLICATION

This application claims priority from Korean Patent Application No. 10-2019-0157218, filed Nov. 29, 2019, which is hereby incorporated by reference for all purposes as if fully set forth herein.

BACKGROUND

Technical Field

Embodiments of the present disclosure relate to a backlight unit and a display device including the backlight unit.

Description of the Related Art

Flat panel display devices are widely used throughout the industry. Among the flat panel display devices, a liquid crystal display (LCD) device can display the image using a liquid crystal, in particular, the image can be displayed by adjusting the light transmittance emitted from the backlight unit in response to a characteristic in which the transmittance is adjusted by changing the arrangement of the liquid crystal. The liquid crystal display device may utilize a light emitting diode (LED), a cold cathode fluorescent lamp (CCFL), and a hot cathode fluorescent lamp (HCFL) as a light source of a backlight unit. Recently, the light emitting diodes having excellent light efficiency and high color reproducibility are widely used as light sources of the backlight units.

The backlight unit may be classified into an edge-type or a direct-type according to the arrangement of the light source and the transmission mode of light. In the direct-type backlight unit, the light source such as the LED may be disposed on the rear surface of the display device.

The light source device used in the direct-type backlight unit may include a light emitting diode, a substrate on which the light emitting diode is mounted, and a circuit element for driving the same. In addition, a phosphor film containing an expensive phosphor may be disposed on the light emitting diode so that light emitted from the light emitting element is excited to exhibit color. However, since the phosphor film may include a large amount of phosphor, the manufacturing cost of the backlight unit may increase. In addition, if the light emitted from the light emitting element is not sufficiently excited, there may be a problem in that the color reproduction rate decreases.

BRIEF SUMMARY

The present disclosure provides a backlight unit having a uniform luminance or brightness and a display device including such a backlight unit.

Further, the present disclosure provides a backlight unit capable of reducing the width of a bezel and a display device including the same.

In accordance with an aspect of the present disclosure, there may be provided with a backlight unit comprising: a plurality of light emitting elements disposed on a substrate; a first reflector disposed on the substrate and including a plurality of holes, one of the plurality of light emitting elements being disposed in each hole; a light conversion sheet disposed on the substrate and having a light conversion pattern disposed at a position overlapping the light emitting element; and a phosphor sheet having a first phosphor disposed on the substrate, wherein a size of first light emitting elements disposed on the edge of the substrate among the plurality of light emitting elements is larger than size of second light emitting elements disposed in the center of the substrate.

In accordance with another aspect of the present disclosure, there may be provided with a display device comprising: a display panel; and a backlight unit disposed under the display panel and emitting light to the display panel, wherein the backlight unit includes; a plurality of light emitting elements disposed on a substrate, a first reflector disposed on the substrate and including a plurality of holes, one of the plurality of light emitting elements being disposed in each hole, a light conversion sheet disposed on the substrate and having a light conversion pattern disposed at a position overlapping the light emitting element, and a phosphor sheet having a first phosphor disposed on the substrate, wherein a size of first light emitting elements disposed on the edge of the substrate among the plurality of light emitting elements is larger than size of second light emitting elements disposed in the center of the substrate.

According to embodiments of the present disclosure, it is possible to provide with a backlight unit having a uniform luminance or brightness and a display device including such a backlight unit.

According to embodiments of the present disclosure, it is possible to provide with a backlight unit capable of reducing the width of a bezel and a display device including the same.

BRIEF DESCRIPTION OF THE SEVERAL VIEWS OF THE DRAWINGS

FIGS. 10A and 10B are diagrams illustrating examples of the structure according to the position of the light conversion pattern included in the backlight unit shown in FIG. 9;

DETAILED DESCRIPTION

Figure 1:
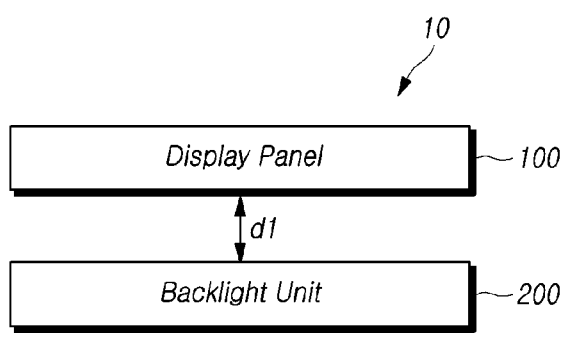
FIG. 1 is a structural diagram illustrating the display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including," "having," "containing," "constituting," "make up of," and "formed of" used herein are generally intended to allow other components to be added unless the terms are used with the term "only." As used herein, singular forms are intended to include plural forms unless the context clearly indicates otherwise.

Terms, such as "first," "second," "A," "B," "(A)," or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to," "contacts or overlaps," etc., a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc., each other via a fourth element. Here, the second element may be included in at least one of two or more elements that "are connected or coupled to," "contact or overlap," etc., each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc., are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified.

FIG. 1 is a diagram illustrating a schematic configuration of a display device 10 according to embodiments of the present disclosure.

Referring to FIG. 1, the display device 10 may include the display panel 100 and the backlight unit 200 emitting light to the display panel 100.

In some embodiments, the display panel 100 may be a liquid crystal panel. The liquid crystal panel includes the liquid crystal layer in which a difference in transmittance may occur depending on the arrangement of liquid crystal molecules, the pixel electrode selectively applying the voltage to the liquid crystal layer, and the common electrode corresponding to the pixel electrode and applying the common voltage to the liquid crystal layer. The liquid crystal layer may be disposed between the pixel electrode and the common electrode, and an arrangement of liquid crystal molecules may be determined in correspondence to the voltage applied between the pixel electrode and the common electrode. Also, the display panel 100 may include a color filter. In addition, the display panel 100 may further include the pixel circuit that selectively applies the voltage to the pixel electrode, and the drive circuit that supplies signals and voltages to the pixel circuit.

The backlight unit 200 may be disposed under the display panel 100 and irradiate light uniformly on the front surface of the display panel 100 from the bottom of the display panel 100. The backlight unit 200 may generate and irradiate light using a light emitting diode. The backlight unit 200 may be spaced apart from the display panel 100 by a certain distance d1. The term "unit" as used throughout the specification includes within its meaning component, element, module, member, or the like.

Figure 2:
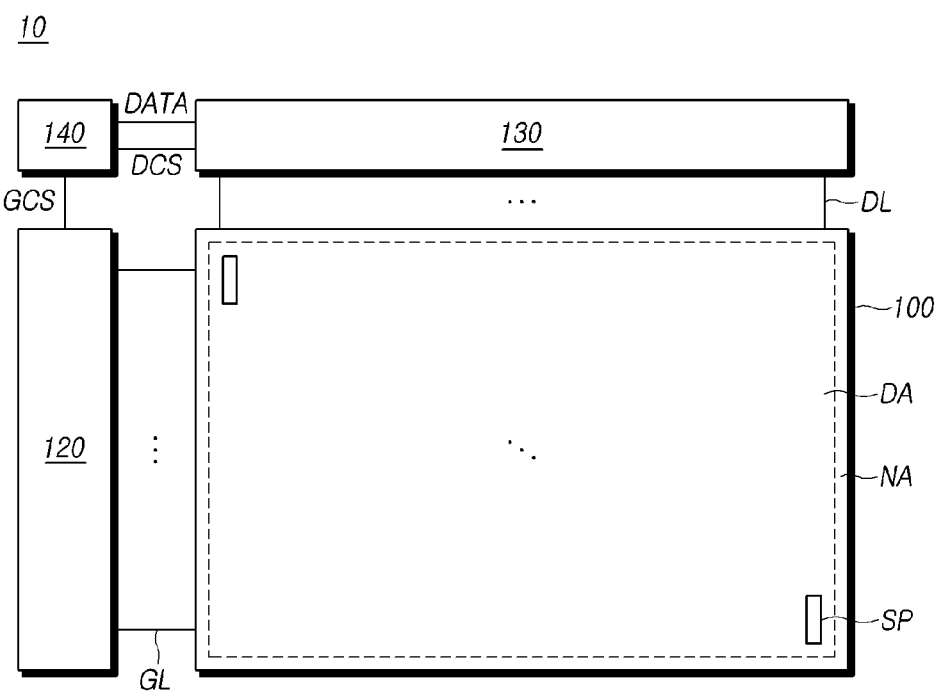
FIG. 2 is a structural diagram illustrating a structure of a display panel included in the display device according to embodiments of the present disclosure.

FIG. 2 is a structural diagram illustrating a structure of a display panel included in the display device according to embodiments of the present disclosure.

Referring to FIG. 2, the display device 10 according to embodiments of the present disclosure may include the display panel 100 including the active area DA and a non-active area NA, the gate driving circuit 120 and the data driving circuit 130 for driving the display panel 100, the controller 140 and the like.

In the display panel 100, a plurality of gate lines GL and a plurality of data lines DL may be disposed, and a subpixel SP may be adjacently located in an area where the gate lines GL and the data lines DL overlap. Also, the display panel 100 may be the liquid crystal panel. The liquid crystal panel may include the pixel electrode, the common electrode, and the liquid crystal layer disposed between the pixel electrode and the common electrode. The liquid crystal layer may display the image by blocking or transmitting light by changing the molecular arrangement in response to the voltage applied to the pixel electrode and the common electrode.

The gate driving circuit 120 may be controlled by the controller 140, and may sequentially output the scan signal to the plurality of gate lines GL arranged on the display panel 100, thereby can control the driving timing of the multiple subpixels SP. The gate driving circuit 120 may include one or more gate driver integrated circuits (GDIC), and may be located on one side of the display panel 100 or on both sides according to a driving method. Each gate driver integrated circuit (GDIC) may be connected to a bonding pad of the display panel 100 by a tape-automated bonding (TAB) method or a chip-on-glass (COG) method, or may be implemented as a gate-in-panel (GIP) type and directly disposed on the display panel 100. Alternatively, each gate driver integrated circuit (GDIC) may be integrated and disposed in the display panel 100. Further, each gate driver integrated circuit (GDIC) may be implemented in a chip on film (COF) method mounted on a film connected to the display panel 100.

The data driving circuit 130 may receive image data from the controller 140 and convert the image data to an analog data voltage. The data driving circuit 130 may output the data voltage to each data line DL according to the timing at which the scan signal is applied through the gate line GL, so that each subpixel SP can express brightness according to image data. The data driving circuit 130 may include one or more source driver integrated circuits (SDICs). Each source driver integrated circuit (SDIC) may include a shift register, a latch circuit, a digital-to-analog converter, and an output buffer, however, is not limited thereto.

Each source driver integrated circuit (SDIC) may be connected to the bonding pad of the display panel 100 by the tape automated bonding (TAB) method or the chip-on-glass (COG) method, or directly disposed on the display panel 100, or, in some cases, may be integrated and directly disposed in the display panel 100. In addition, each source driver integrated circuit (SDIC) may be implemented in a chip-on-film (COF) method in which each source driver integrated circuit (SDIC) is mounted on a film connected to the display panel 100 and electrically connected to the display panel 100 through lines on the film.

The controller 140 may supply various control signals to the gate driving circuit 120 and the data driving circuit 130, and can control the operation of the gate driving circuit 120 and the data driving circuit 130. The controller 140 may be mounted on a printed circuit board, a flexible printed circuit, or the like, and may be electrically connected to the gate driving circuit 120 and the data driving circuit 130 through a printed circuit board, a flexible printed circuit, or the like. The controller 140 may control the gate driving circuit 120 to output the scan signal according to the timing implemented in each frame, and may output the converted image data by converting the externally received image data according to the data signal format used by the data driving circuit 130 to the data driving circuit 130. The controller 140 may receive various timing signals including vertical synchronizing signal VSYNC, horizontal synchronizing signal HSYNC, input data enable signal DE, clock signal CLK, and the like along with image data from the outside (e.g., a host system).

The controller 140 may generate various control signals using various timing signals received from the outside and output the control signals to the gate driving circuit 120 and the data driving circuit 130. For example, in order to control the gate driving circuit 120, the controller 140 may output various gate control signals GCS including a gate start pulse GSP, a gate shift clock GSC, and a gate output enable signal GOE etc. Here, the gate start pulse GSP may control the operation start timing of one or more gate driver integrated circuits GDIC constituting the gate driving circuit 120. The gate shift clock GSC is a clock signal commonly input to one or more gate driver integrated circuits GDIC, and can control the shift timing of the scan signal. The gate output enable signal GOE may specify timing information of one or more gate driver integrated circuits GDIC.

In addition, in order to control the data driving circuit 130, the controller 140 may output various data control signals DCS including a source start pulse SSP, a source sampling clock SSC, and a source output enable SOE, etc. Here, the source start pulse SSP may control the data sampling start timing of one or more source driver integrated circuits SDICs constituting the data driving circuit 130. The source sampling clock SSC may be a clock signal that controls sampling timing of data in each of the source driver integrated circuits SDIC. The source output enable SOE signal may control the output timing of the data driving circuit 130.

The display device 10 may further include a power management integrated circuit which supplies various voltages or currents to the display panel 100, the gate driving circuit 120, and the data driving circuit 130, or controls various voltages or currents to be supplied.

Figure 3:
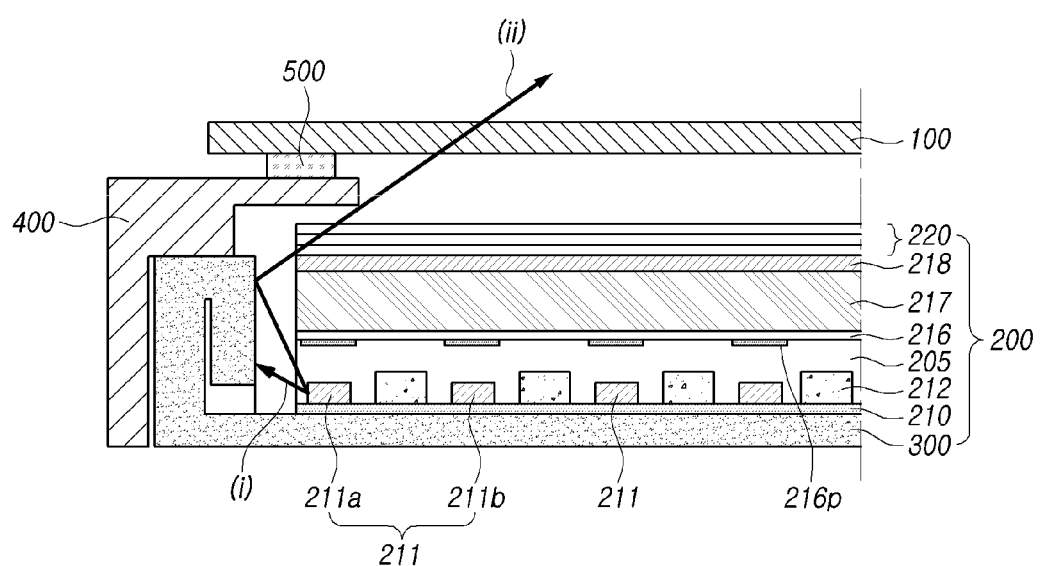
FIG. 3 is a diagram illustrating an example of a structure of the backlight unit included in the display device according to embodiments of the present disclosure.
Figure 4:
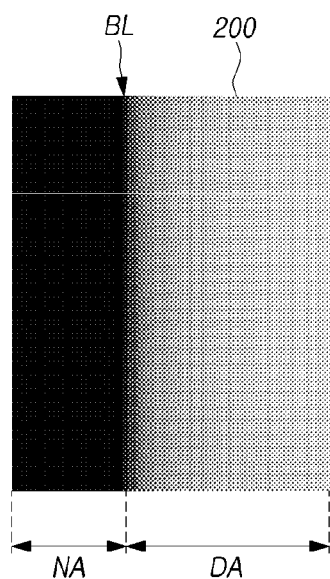
FIG. 4 is a plan view illustrating a portion of the backlight unit employed in the display device.
Figure 5:
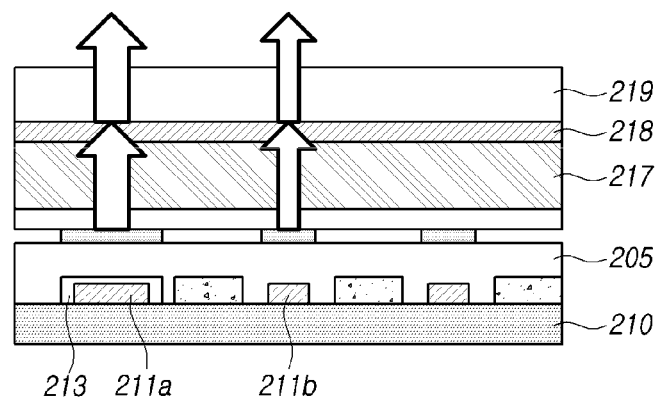
FIG. 5 is a cross-sectional view illustrating light emitting elements disposed on the substrate in the backlight unit according to embodiments of the present disclosure.

FIG. 3 is a diagram illustrating an example of a structure of the backlight unit included in the display device according to embodiments of the present disclosure, FIG. 4 is a plan view illustrating a portion of the backlight unit employed in the display device, and FIG. 5 is a cross-sectional view illustrating light emitting elements disposed on the substrate in the backlight unit according to embodiments of the present disclosure.

Referring FIGS. 3 to 5, the display device 10 according to embodiments of the present disclosure may include the display panel 100 and the backlight unit 200 disposed below the display panel 100 and supplying light to the display panel 100.

A plurality of structures may be disposed between the backlight unit 200 and the display panel 100. For example, the guide panel 400 and the foam pad 500 may be disposed between the backlight unit 200 and the display panel 100, and the display panel 100 may be fixed on the backlight unit 200 by the guide panel 400 and the foam pad 500.

The backlight unit 200 may include a cover bottom 300 that accommodates optical elements or the like constituting the backlight unit 200.

The substrate 210 may be disposed on the cover bottom 300, and a plurality of light emitting elements 211 may be disposed on the substrate 210. The substrate 210 may reflect light. The substrate 210 may include a reflective material. The substrate 210 and the reflector 212 may be coated with a white pigment to reflect light. The white pigment may include photo solder resist (PSR). However, it is not limited thereto.

The light emitting elements 211 may be, for example, a light emitting diode (LED), or may be a small mini light emitting diode (Mini LED) or a small micro light emitting diode (μLED). In addition, the light emitting elements 211 may be disposed in a form in which the chip type light emitting element 211 is mounted on the substrate 210, thereby reducing the thickness of the backlight unit 200 and providing a light source having a wide emission angle and a high light efficiency. A structure in which the light emitting element 211 is mounted on the substrate 210 may be referred to as a flip chip light emitting element 211.

The light emitting element 211 may emit light in a white wavelength band, or in some cases, emit light in a specific wavelength band (e.g., blue wavelength band). The substrate 210 may be a printed circuit board. The reflector 212 may be disposed on at least some of the regions in which the light emitting element 211 is not disposed on the substrate 210. The light source protection unit 205 may be disposed on the plurality of light emitting elements 211 and the reflector 212. The light source protection unit 205 may protect a plurality of light emitting elements 211 and may provide a function of diffusing light emitted from the light emitting elements 211. The light source protection unit 205 may be a resin layer including resin.

The light conversion sheet 216 may be disposed on the light source protection unit 205. The light conversion sheet 216 may include a plurality of light conversion patterns 216p disposed on a surface facing the light emitting element 211. Here, the plurality of light conversion patterns 216p may be disposed at positions corresponding to each of the plurality of light emitting elements 211 on the lower surface of the light conversion sheet 216. In addition, the light conversion pattern 216p may transmit a portion of light emitted from the light emitting element 211. The light conversion sheet 216 may be a light control sheet capable of transmitting a portion of light. The light emitted from the light emitting element 211 is scattered, reflected, diffracted, or transmitted by the light conversion pattern 216p, thereby enhancing the image quality of the backlight unit 200.

Since the light conversion pattern 216p may be disposed in a region where the intensity of light emitted from the light emitting element 211 is strongest, it is possible to reduce the luminance deviation between the region where the light emitting element 211 is disposed (e.g., a region having a large amount of light) and the region between the light emitting elements 211 (e.g., a region having a small amount of light).

The light conversion sheet 216 may include an optical conversion material. In addition, the light conversion pattern 216p of the light conversion sheet 216 may include the optical conversion material. The optical conversion material may include titanium dioxide ($TiO_2$). In addition, the optical conversion material may be white, however, is not limited thereto.

A diffusion plate 217 for diffusing light incident from the bottom may be disposed on the light conversion sheet 216. In addition, the phosphor sheet 218 and one or more optical sheets 219 may be disposed on the diffusion plate 217. The phosphor sheet 218 may include the first phosphor, and when the light incident on the phosphor sheet 218 is blue light, the first phosphor may allow the light to be converted to white light when the light passes through the phosphor sheet 218.

In the cast of the backlight unit 200 as described above, some of the light emitted from the light emitting element 211 disposed on the edge of the substrate 210 may be scattered by colliding with the cover bottom 300 and may not pass through the phosphor sheet 218. Therefore, the luminance at the edge of the backlight unit 200 may be lowered.

FIG. 4 illustrates a part of the backlight unit, and an area corresponding to the non-display area NA and the display area DA of the display panel is illustrated. As illustrated in FIG. 4, the area corresponding to the non-display area NA may have low luminance because light is not transmitted, and the area corresponding to the display area DA may have high luminance.

The area corresponding to the non-display area NA may be covered by the bezel of the display device. However, it can be seen that a blue thin band is displayed due to the Mura near the boundary BL between the area corresponding to the non-display area NA and the area corresponding to the display area DA.

Since the light emitted from the backlight unit 200 has a higher color temperature than normal white light, it may be recognized as, for example, a bluish color. And, as illustrated in FIG. 4, the blue thin band displayed due to the Mura may appear in a darker color at the edge of the backlight unit 200. In addition, the border of the backlight unit may appear darker due to the blue band.

In order to prevent the luminance from being lowered near the boundary BL between the display area DA and the non-display area NA, in the backlight unit 200 according to embodiments of the present disclosure, the luminance of the first light emitting element 211a disposed at the edge of the substrate 210 may be set higher than that of the second light emitting element 211b disposed at the central portion of the substrate 210 as shown in FIG. 5. Accordingly, it is possible to prevent the luminance from deteriorating near the boundary BL between the display area DA and the non-display area NA. The arrow indicates the amount of light. That is, a thick arrow indicates that the light intensity is greater and the luminance is higher than that of the thin arrow.

The luminance of the light emitting element 211 may be proportional to the size of the light emitting element, and the size of the first light emitting element 211a may be larger than the size of the second light emitting element 211b. In addition, the size of the first light emitting element 211a may be about 1.6 times the size of the second light emitting element 211b. However, the ratio of the sizes of the first light emitting elements 211a and the second light emitting elements 211b is not limited thereto.

In addition, as illustrated in FIG. 3, some of the other light (ii) emitted from the first light emitting element 211a may be reflected from the cover bottom 300 so that the path may be changed to direct toward the display panel 100. The light (ii) having the changed path may not pass through the phosphor sheet 218. Therefore, some of other light (ii) emitted from the first light emitting element 211a may be irradiated to the border of the backlight unit 200 without the color conversion. In addition, in the case that the first light emitting element 211a emits blue light, more blue light appears on the edge of the backlight unit 200, so that the blue thin band may be more strongly displayed at the border.

In order to solve the above problem, in the backlight unit 200 illustrated in FIG. 5, the color resin 213 surrounding the light emitting surface of the first light emitting element 211a may be further disposed on the substrate 210. The color resin 213 may include the second phosphor. The second phosphor may emit light of the same color (or substantially the same color) as the first phosphor included in the phosphor sheet 218. That is, the light emitted from the first light emitting element 211a may be white light by the second phosphor. Therefore, even if the light emitted from the first light emitting element 211a does not pass through the phosphor sheet 218, it may be the same color (or substantially the same color) as the light passing through the phosphor sheet 218.

When the first light emitting element 211a is made larger or the color resin is disposed on the light emitting surface of the first light emitting element 211a as described above, the intensity of blue light irradiated near the boundary BL of the backlight unit 200 may be weakened, thereby the occurrence of the Mura can be suppressed. Due to the suppression of the occurrence of Mura, the Mura may not occur or the size of the area where Mura occurs may be reduced, thereby the size of the area covered by the bezel may be reduced. Therefore, the implementation of the narrow bezel on the display device 10 may be easier.

In addition, the size of the first light emitting element 211a may be larger than that of the second light emitting element 211b, so that the size of the light conversion pattern 216p disposed at a position overlapping the first light emitting element 211a may be larger. However, the size of the light conversion pattern 216p is not limited thereto.

Figure 6A:
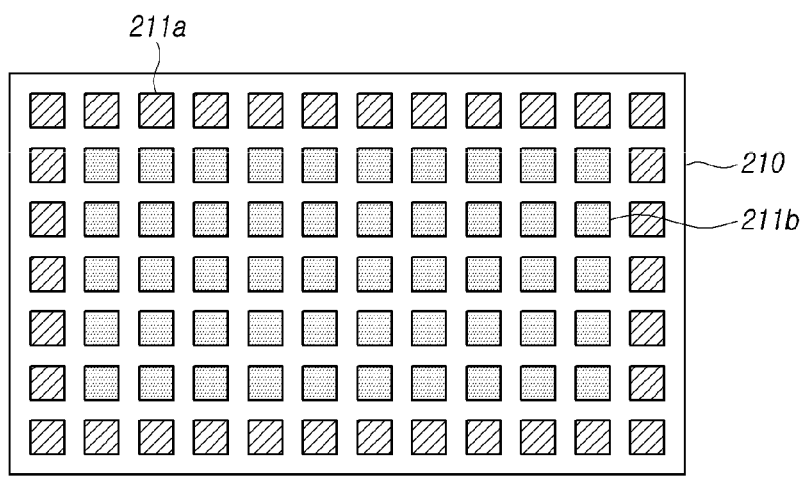
FIGS. 6A and 6B are plan views showing arrangements of light emitting elements disposed in the backlight unit according to the present disclosure.
Figure 6B:
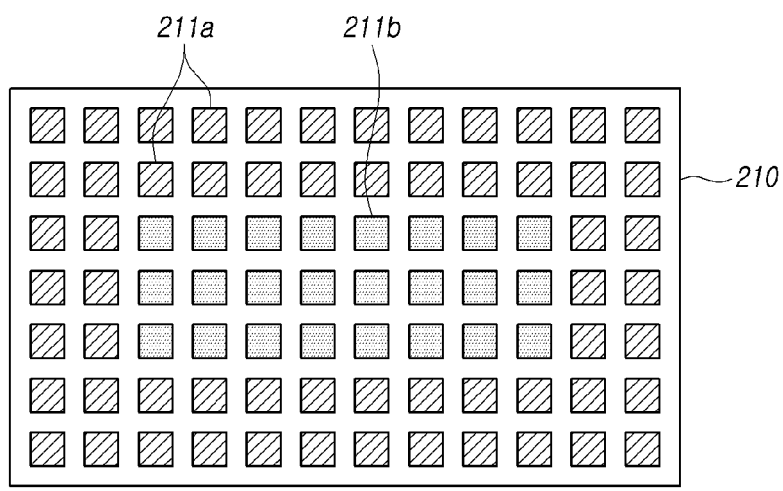

FIGS. 6A and 6B are plan views showing arrangements of light emitting elements disposed in the backlight unit according to the present disclosure.

Referring to FIGS. 6A and 6B, in the backlight unit 200, the first light emitting element 211a may be disposed on the edge of the substrate 210, and the second light emitting element 211b may be disposed inside the first light emitting element 211a on the substrate 210. The first light emitting element 211a may be the light emitting element whose light emitting surface is surrounded by the color resin 213 and the second light emitting element 211b may be a light emitting element whose light emitting surface is not surrounded by a color resin.

Here, although the first light emitting element 211a and the second light emitting element 211b are shown to be the same size, the present disclosure is not limited thereto.

In addition, as shown in FIG. 6A, the first light emitting element 211a may be arranged in one line along the edge of the substrate 210, or the first light emitting element 211a may be arranged in two lines along the edge of the substrate 210 as shown in FIG. 6B. However, it is not limited thereto. In addition, the number of light emitting elements 211a and 211b is not limited to the numbers shown in FIGS. 6A and 6B.

Figure 7:
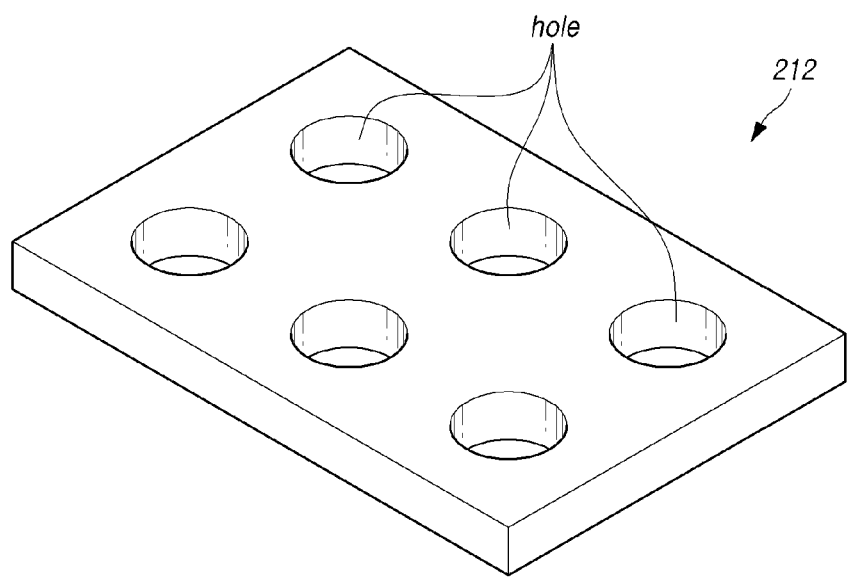
FIG. 7 is a perspective view illustrating the reflector according to embodiments of the present disclosure.

FIG. 7 is a perspective view illustrating the reflector according to embodiments of the present disclosure.

Referring to FIG. 7, the reflector 212 may reflect light emitted from the light emitting element 211. The reflector 212 may be disposed on the substrate 210. The reflector 212 may include a plurality of holes, and each of the light emitting elements 211 may be disposed in each hole. The first light emitting element 211a and the second light emitting element 211b having different sizes may be disposed on the substrate 210, but the size of the holes included in the reflector 212 may be the same (or substantially the same). However, the present disclosure is not limited thereto, and the size of the hole may correspond to the size of the light emitting element 211. That is, the size of the hole in which the first light emitting element 211a is disposed may be larger. In addition, the hole included in the reflector 212 is shown as being circular, but the shape of the hole is not limited thereto.

FIGS. 8A to 8E are diagrams illustrating examples of specific structure of the backlight unit illustrated in FIG. 2.

Figure 8A:
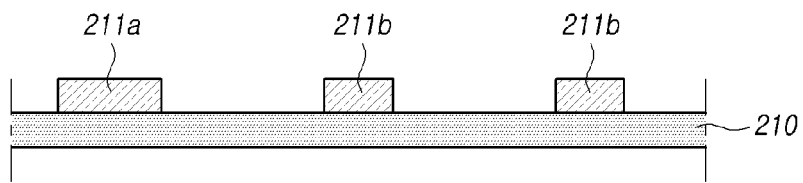
FIGS. 8A to 8E are diagrams illustrating examples of specific structure of the backlight unit illustrated in FIG. 2.

Referring to FIG. 8A, the plurality of light emitting elements 211a and 211b may be disposed on the substrate 210. The reflective film coated on the substrate 210 may be disposed. The coated reflective film may be a white pigment. That is, the white pigment may be coated to the substrate 210. The plurality of light emitting elements 211a and 211b disposed on the substrate 210 may be divided into the first light emitting element 211a and the second light emitting element 211b according to the position of the substrate 210, and the size of the first light emitting element 211a may be larger than that of the second light emitting element 211b.

Figure 8B:
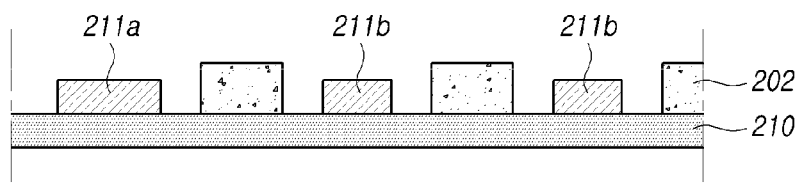

Referring to FIG. 8B, the reflector 212 may be disposed on at least some of the regions except the region in which the light emitting elements 211a and 211b are disposed on the substrate 210.

The reflector 212 may be formed as the structure in which an area corresponding to the light emitting elements 211a and 211b is opened and may be disposed on the substrate 210. In addition, the reflector 212 may reflect light emitted from the light emitting element 211a and 211b to the front surface of the backlight unit 200 to increase the light efficiency of the backlight unit 200. Here, in the case that the light emitting elements 211a and 211b are disposed in the form of a chip, since the size of the light emitting element 211a and 211b is small, the height of the reflector 212 may be greater than the height of the light emitting element 211.

Accordingly, light emitted in the lateral direction of the light emitting element 211a and 211b may be reflected from the side of the reflector 212 and may be emitted to the front of the backlight unit 200, thereby the light efficiency of the backlight unit 200 can further increase.

In addition, after the reflector 212 is disposed, the color resin 213 illustrated in FIG. 5 may cover the first light emitting element 211a. The color resin 213 may include a phosphor.

Figure 8C:
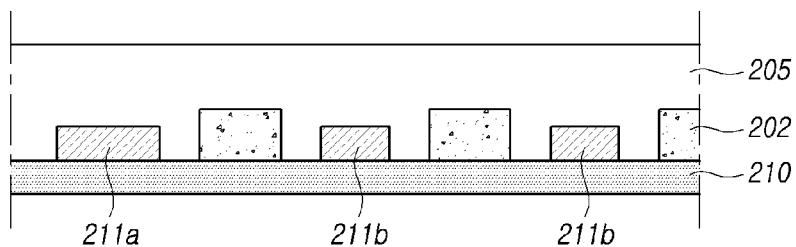

Referring to FIG. 8C, the light source protection unit 205 may be disposed on the plurality of light emitting elements 211a and 211b and the reflector 212. The light source protection unit 205 may include, for example, resin. If the light source protection unit 205 includes the resin, the light source protection unit 205 may be formed on substrate 210 by disposing the partition wall in a region outside the region in which the plurality of light emitting elements 211a and 211b are disposed in the outer side of the substrate 210 or in the region outside the substrate 210, and by coating the resin inside of the partition wall.

The light source protection unit 205 may serve to protect a plurality of light emitting elements 211a and 211b disposed on the substrate 210, and may diffuse light emitted from the light emitting elements 211a and 211b to provide the function of the light guide plate. Light emitted from the light emitting element 211a and 211b may spread as evenly as possible to the top surface of the light source protection unit 205 by the light source protection unit 205. At this time, even though the direction in which light spreads by the light source protection unit 205 is adjusted by the reflector 212, the intensity of light emitted in the vertical direction of the light emitting element 211a and 211b may be relatively large, and accordingly, the luminance uniformity of the backlight unit 200 may be reduced.

In the embodiments of the present disclosure, the light conversion pattern 216p having optical characteristics is disposed on the light source protection unit 205 at a position corresponding to the light emitting element 211a and 211b, thereby improving the brightness uniformity while reducing the thickness of the backlight unit 200.

Figure 8D:
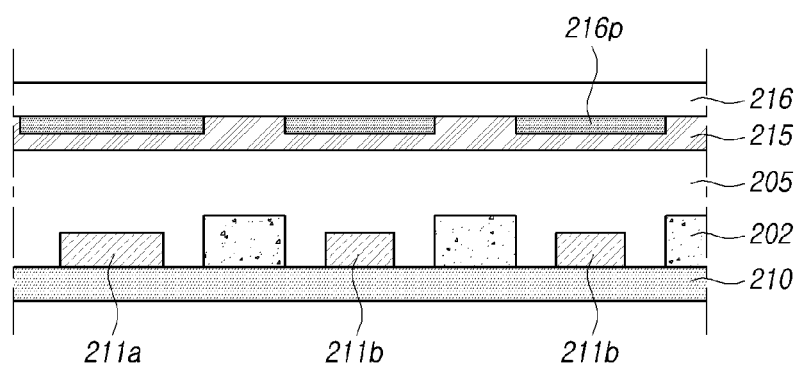

Referring to FIG. 8D, the light conversion sheet 216 may be disposed on the light source protection unit 205, and a plurality of light conversion patterns 216p may be disposed on the lower surface of the light conversion sheet 216. However, the present disclosure is not limited thereto, and the plurality of light conversion patterns 216p may be disposed on the top surface of the light conversion sheet 216. Further, the light conversion sheet 216 may be adhered to the light source protection unit 205 through the adhesive film 215. The adhesive film 215 may be an optical clear adhesive (OCA) film. In addition, the light conversion sheet 216 may be formed of, for example, PET, but is not limited thereto.

Each of the plurality of light conversion patterns 216p disposed on the lower surface or the upper surface of the light conversion sheet 216 may be disposed to correspond to each of the plurality of light emitting elements 211a and 211b disposed on the substrate 210. For example, the light conversion pattern 216p may be disposed such that at least a portion overlaps with the light emitting element 211a and 211b. That is, in consideration of the diffusion characteristics of light, the light conversion pattern 216p may be arranged to overlap the region including the region where the light emitting element 211a and 211b is disposed.

The light conversion pattern 216p may scatter, reflect, diffract, or transmit light emitted from the light emitting element 211a and 211b. For example, the light conversion pattern 216p may scatter light emitted from the light emitting element 211a and 211b so that light is emitted. Further, the light conversion pattern 216p may reflect light emitted in the vertical direction from the light emitting element 211a and 211b and be reflected back by the reflector 212 so that light is emitted to the region between the light emitting element 211a and 211b.

In this way, the light emitted from the light emitting element 211a and 211b may be scattered, reflected, diffracted or transmitted by the light conversion pattern 216p, so that the luminance uniformity of the backlight unit 200 can be improved.

Figure 8E:
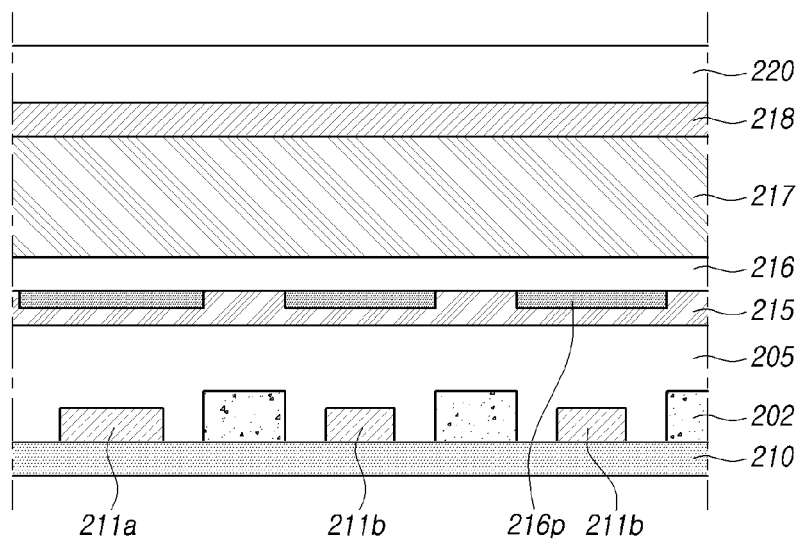

Referring to FIG. 8E, the diffusion plate 217 may be disposed on the light conversion sheet 216, and the phosphor sheet 218 may be disposed on the diffusion plate 217. In addition, one or more optical sheets 219 may be disposed on the phosphor sheet 218. Here, the positions where the diffuser plate 217 and the phosphor sheet 218 are disposed may be interchanged. The diffusion plate 217 may diffuse light emitted through the light conversion sheet 216.

The phosphor sheet 218 may include a phosphor having a specific color, and excite the incident light to emit light in a specific wavelength band. Therefore, the light passing through the phosphor sheet 218 may have a specific color included in the phosphor sheet 218 or a color mixed with a specific color. For example, if the light emitting element 211 emits light in the first wavelength band (e.g., blue light), the phosphor sheet 218 may react to incident light to generate the light (e.g., green light) of the second wavelength band and the light (e.g., red light) of the third wavelength band, and may finally emit white light. The phosphor included in the phosphor sheet 218 may emit light of the same color (or substantially the same color) as the phosphor included in the color resin 213.

In addition, the phosphor sheet 218 may be disposed in some areas on the diffusion plate 217, if desired. For example, when the light emitting elements 211a and 211b emit light in the blue wavelength band, the phosphor sheet 218 may be disposed only in an area except the area corresponding to the area where the blue subpixel SP is disposed in the display panel 100. That is, light that does not pass through the phosphor sheet 218 may reach the blue subpixel SP of the display panel 100.

In addition, the phosphor sheet 218 may not be disposed on the display panel 100 according to the light emitting elements 211a and 211b. For example, in the case that the light emitting elements 211a and 211b emit light in the white wavelength band, or in the case that a color conversion film emitting light in the green wavelength band and light in the red wavelength band is coated on the light emitting surface of the light emitting element 211a, 211b, the phosphor sheet 218 may not be disposed.

As described above, embodiments of the present disclosure include the light conversion sheet 216 including the light conversion pattern 216p disposed at a position corresponding to the light emitting element 211a and 211b, and various optical elements, thereby improving the image quality represented by the backlight unit 200 while reducing the thickness of the backlight unit 200.

Hereinafter, embodiments of the present disclosure will be described together with specific examples of the light conversion pattern 216p disposed on the light conversion sheet 216.

Figure 9:
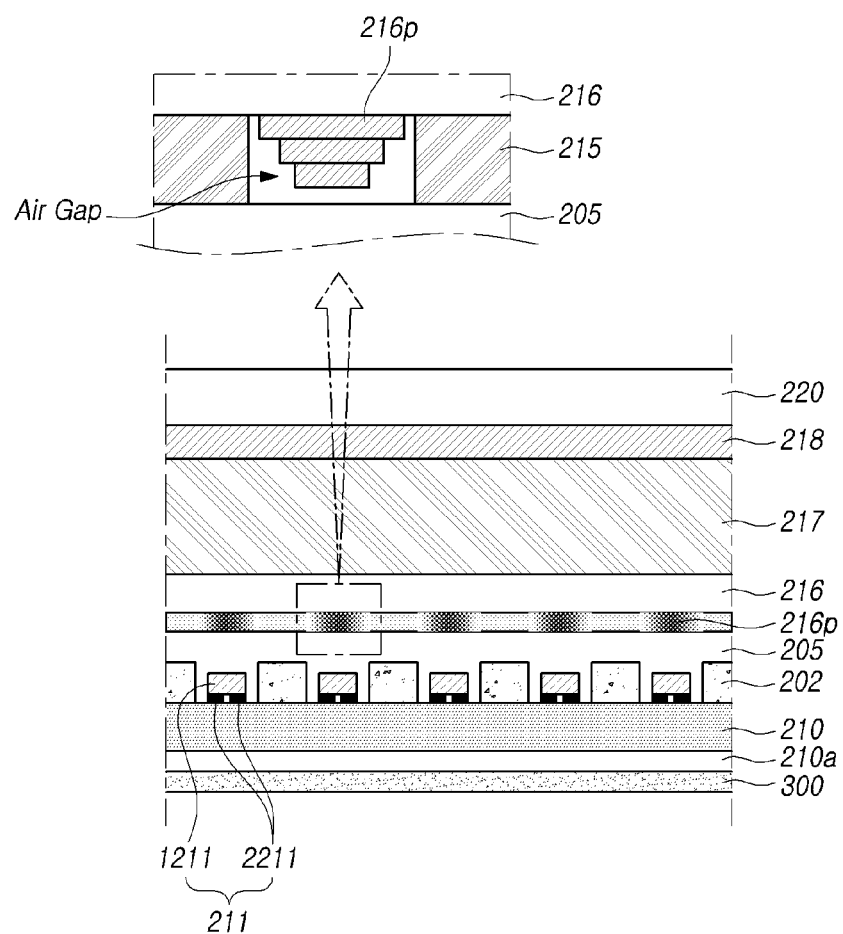
FIG. 9 is a diagram illustrating a first embodiment of the structure of the backlight unit according to embodiments of the present disclosure.

FIG. 9 is a diagram illustrating a first embodiment of the structure of the backlight unit according to embodiments of the present disclosure.

Referring to FIG. 9, the substrate 210 is disposed on the cover bottom 300, and the substrate 210 may be adhered to the cover bottom 300 by the adhesive tape 210a disposed between the cover bottom 300 and the substrate 210.

The plurality of light emitting elements 211 may be disposed on the substrate 210, and the reflector 212 may be disposed in at least a part of the regions except for the region in which the light emitting elements 211 are disposed.

The light emitting element 211 may be, for example, the light emitting diode (LED), and may include a light emitting unit 1211 including an n-type semiconductor layer, an activation layer, and a p-type semiconductor layer, and an electrode unit 2211. The light source protection unit 205 may be disposed on the plurality of light emitting elements 211 and the reflector 212. The light conversion sheet 216 on which the light conversion pattern 216p is disposed may be disposed on the light source protection unit 205 at a position corresponding to the light emitting element 211. In addition, the diffusion plate 217, the phosphor film 218 and the optical sheet 219 may be disposed on the light conversion sheet 216.

The light conversion pattern 216p disposed on the lower surface of the light conversion sheet 216 may be formed by printing a material having light conversion characteristics on the light conversion sheet 216. For example, the light conversion pattern 216p may be formed by printing an ink containing titanium dioxide ($TiO_2$) on the light conversion sheet 216. In addition, the light conversion pattern 216p disposed on the lower surface of the light conversion sheet 216 may be arranged in one layer or may be arranged in a multi-layer structure.

That is, as shown in FIG. 9, the light conversion pattern 216p disposed on the lower surface of the light conversion sheet 216 may be composed of three layers. The light conversion pattern 216p may be formed through a method of printing the light conversion material on the light conversion sheet 216 three times, and the area of the printed light conversion material may be gradually narrowed. In addition, the light conversion pattern 216p may be disposed on the light emitting element 211 by inverting the light conversion sheet 216 on which the light conversion pattern 216p is disposed and placing it on the light source protection unit 205.

Therefore, the area of the light conversion pattern 216p may be gradually narrowed toward the bottom of the light conversion sheet 216, and the thickness of the central portion of the light conversion pattern 216p may be greater than the thickness of the outer portion.

That is, since the intensity of light emitted in the vertical direction from the light emitting element 211 is the largest, the central portion of the light conversion pattern 216p may be disposed thicker. However, it is not limited thereto.

In this way, by allowing the light conversion pattern 216p to be disposed on the light emitting element 211, at least a portion of the light emitted in the vertical direction from the light emitting element 211 may be blocked, and as a result, hot spots may be prevented from appearing in an area where the light emitting element 211 is disposed. The light conversion sheet 216 on which the light conversion pattern 216p is disposed may be adhered to the light source protection unit 205 by an adhesive film 215. At this time, the adhesive film 215 may be disposed on at least some of the areas except the area where the light conversion pattern 216p is disposed on the lower surface of the light conversion sheet 216.

Therefore, the adhesive film 215 may not be disposed in the region where the light conversion pattern 216p is disposed, and an air gap may exist between the light conversion pattern 216p and the light source protection unit 205. In addition, the side portion of the light conversion pattern 216p and the adhesive film 215 may be spaced apart from each other. As an air gap exists between the light conversion pattern 216p and the light source protection unit 205, light emitted in the lateral direction of the light conversion pattern 216p may be reflected by the air gap. That is, light emitted in the lateral direction of the light conversion pattern 216p may be emitted at a large refractive angle by the air layer having a low refractive index or may be reflected from the air layer. In addition, light reflected from the air layer is reflected and emitted again by the reflector 212, thereby increasing light efficiency while assisting the light conversion function of the light conversion pattern 216p.

As described above, it is possible to increase the light efficiency of the backlight unit while preventing hot spots by using the structure in which the light conversion pattern 216p and the air gaps are disposed at positions corresponding to the light emitting elements 211. Further, the light conversion pattern 216p disposed under the light conversion sheet 216 may be arranged in a different structure according to the position.

Figure 10B:
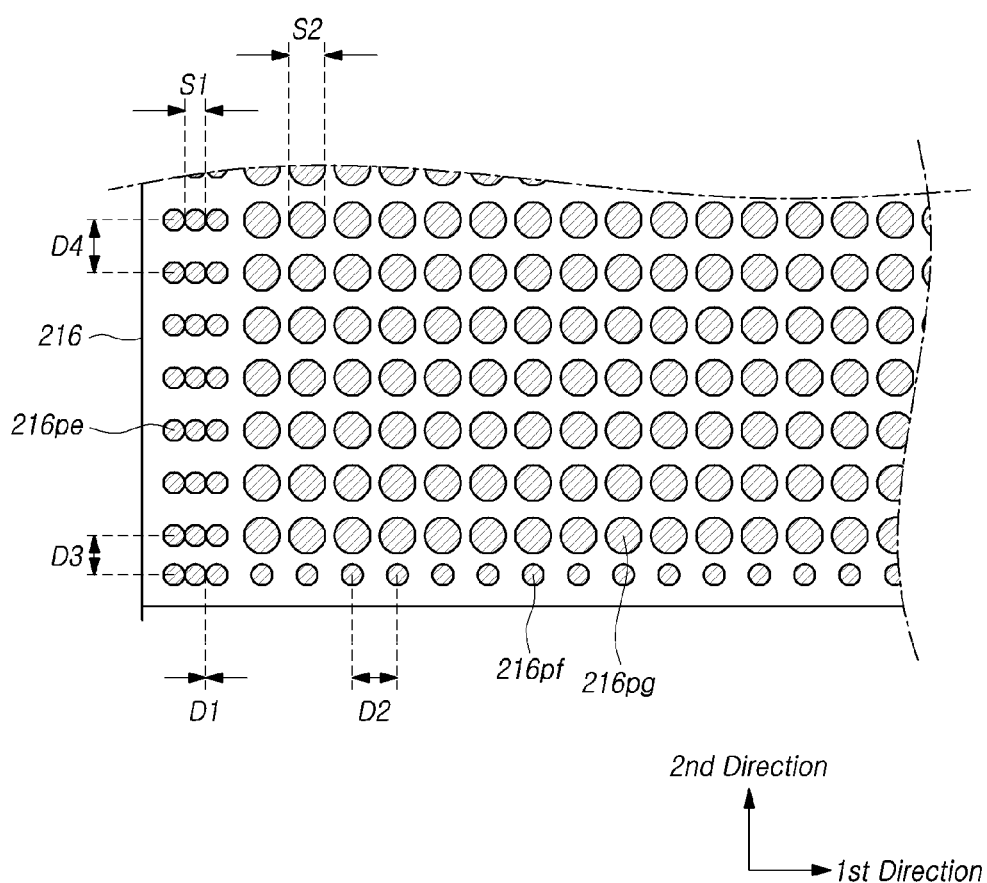

FIGS. 10A and 10B are views illustrating examples of the structure according to the position of the light conversion pattern included in the backlight unit shown in FIG. 9.

FIG. 10A illustrates an example of the brightness of the backlight unit 200 according to the structure of the light conversion pattern 216p, and <EX1> is an example of the brightness measured when the light conversion pattern 216p is arranged in a constant structure, and <EX2> represents an example of the brightness measured when the light conversion pattern 216p is arranged in a different structure according to the position.

As shown in <EX1> of FIG. 10A, in the case that the structure of the light conversion pattern 216pa disposed in the outer region of the backlight unit 200 and the light conversion pattern 216pd disposed in the central region are the same, the luminance or brightness of the outer region of the backlight unit may appear lower than the central region.

That is, since the number of light emitting elements 211 for supplying light to the corresponding area is relatively small in the outer area of the backlight unit 200, when the light conversion pattern 216p having the same level of light conversion characteristics is disposed, the luminance may be lowered compared to the central region of the backlight unit.

Therefore, as shown in <EX2> in FIG. 10A, the structure of the light conversion pattern 216pa disposed in the outer region of the backlight unit 200 and the light conversion pattern 216pd disposed in the central region may be arranged to be different from each other, thereby preventing the decrease in luminance in the outer region of the backlight unit 200 and improving the uniformity of the overall luminance.

For example, the light conversion pattern 216p may be disposed so that the thickness T1 of the light conversion pattern 216pa disposed in the outer region of the backlight unit 200 is smaller than the thickness T2 of the light conversion pattern 216pd disposed in the central region.

Alternatively, the light conversion pattern 216p may be disposed so that the area W1 of the thickest part in the light conversion pattern 216pb disposed adjacent to the outer region of the backlight unit 200 is smaller than the area W2 of the thickest part of the light conversion pattern 216pd arranged in the central area. That is, in the light conversion patterns 216pa and 216pb disposed in the outer region or the region adjacent to the outer region of the backlight unit 200, the area of the portion having a high blocking characteristic may be small.

Alternatively, the light conversion pattern 216p may be disposed so that as the thickness of the light conversion pattern 216p gradually decreases from the center area to the outer area of the backlight unit 200, or the area of the thickest portion in the light conversion pattern 216p gradually decreases. That is, the area of the portion having high blocking characteristics in the light conversion patterns 216pa and 216pb disposed in the outer region or the region adjacent to the outer region of the backlight unit 200 may be made smaller.

In addition, the light conversion pattern 216p may be disposed so that as the thickness of the light conversion pattern 216p gradually decreases from the center area to the outer area of the backlight unit 200, or the area of the thickest portion in the light conversion pattern 216p gradually decreases.

In addition, in some cases, by using a manner in which the number of light emitting elements 211 or the distance between the light emitting elements 211 is different, the structure of the light conversion pattern 216p may be arranged differently in the central region and the outer region of the backlight unit 200.

FIG. 10B shows another example of a structure in which the light conversion pattern 216p is disposed on the lower surface of the light conversion sheet 216.

Here, the distance between the light emitting elements 211 disposed in the outer region of the backlight unit 200 may be smaller than the distance between the light emitting elements 211 disposed in the central region of the backlight unit 200. That is, the light emitting element 211 may be disposed in a more dense structure in the outer region of the backlight unit 200 so that the luminance of the central region and the outer region of the backlight unit 200 may be more uniform.

In addition, since the light conversion pattern 216p disposed on the lower surface of the light conversion sheet 216 is disposed to correspond to the light emitting element 211, the distance between the light conversion pattern 216p disposed in the outer region of the backlight unit 200 may be different from the distance between the light conversion patterns 216p disposed in the central region.

For example, the distance D1 in the first direction of the light conversion pattern 216p disposed in the outer area of the backlight unit 200 may be smaller than the distance D2 in the first direction of the light conversion pattern 216p disposed in the central area. In addition, the distance D3 in the second direction of the light conversion pattern 216p disposed in the outer region of the backlight unit 200 may be smaller than the distance D4 in the second direction of the light conversion pattern 216p disposed in the central area.

At this case, the size, thickness, etc., of the light conversion pattern 216p disposed in the outer region of the backlight unit 200 can be different from the size, thickness, etc., of the light conversion pattern 216p disposed in the central region of the backlight unit 200.

For example, as illustrated in FIG. 10B, the size S1 of the light conversion patterns 216pe and 216pf disposed in the outer region of the backlight unit 200 may be smaller than the size S2 of the light conversion pattern 216pg disposed in the central region of the backlight unit 200.

Alternatively, the light conversion pattern 216p may have a multi-layer structure as described above. In this case, the thickness or the area of the portion having the greatest thickness of the light conversion patterns 216pe and 216pf disposed in the outer area of the backlight unit 200 may be smaller than the thickness or the area of the portion having the greatest thickness of the light conversion pattern 216pg disposed in the central area of the backlight unit 200.

That is, by reducing the size of the light conversion patterns 216pe and 216pf disposed in the outer region of the backlight unit 200, the light conversion pattern can be arranged to correspond to the light emitting element 211 arranged at a narrow interval. Therefore, it is possible to prevent a hot spot from being generated at a position corresponding to the light emitting element 211 in the outer region of the backlight unit 200.

In addition, by lowering the level at which light emitted from the light emitting element 211 is blocked in the outer region of the backlight unit 200, the amount of emitted light may be increased and the luminance in the outer region of the backlight unit 200 may be prevented from deteriorating, thereby ensuring the luminance uniformity in the entire area of the backlight unit 200.

As described above, by differently arranging the structure of the light conversion pattern 216p according to region of the backlight unit 200, it is possible to prevent luminance from being lowered in the outer region of the backlight unit 200 and improve luminance uniformity.

Furthermore, the hot spot of the backlight unit 200 may be prevented and the luminance uniformity may be improved by using the arrangement structure of the light conversion pattern 216p as described above.

In addition, according to the embodiments of the present disclosure, it is possible to provide a method for improving the image quality of the backlight unit 200 and improving light efficiency by diffracting the light emitted in the vertical direction of the light emitting element 211.

Figure 11:
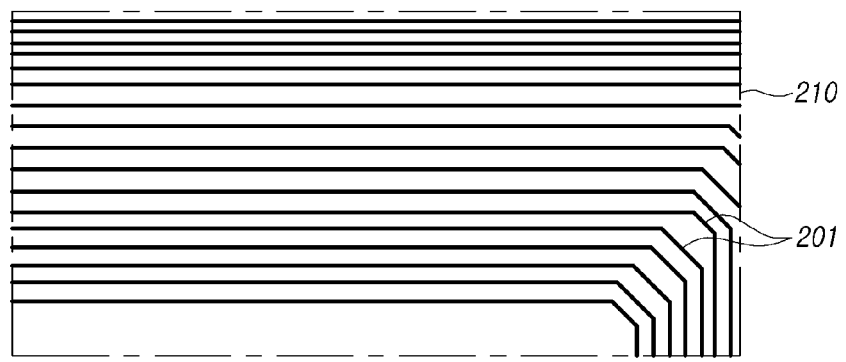
FIG. 11 is a plan view showing the embodiment in which the plurality of lines is arranged on the rear surface of the substrate according to the present disclosure.
Figure 12:
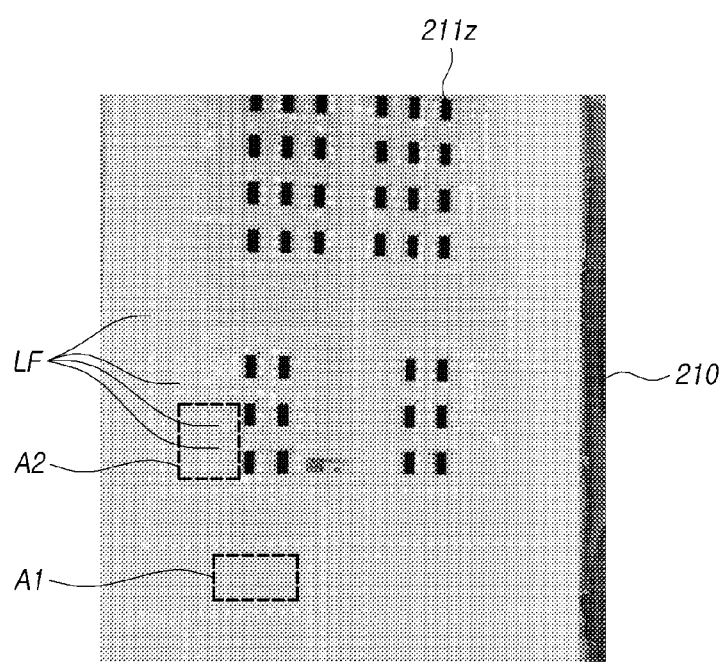
FIG. 12 is a plan view showing the occurrence of the light leakage on the back surface of the substrate.
Figure 13:
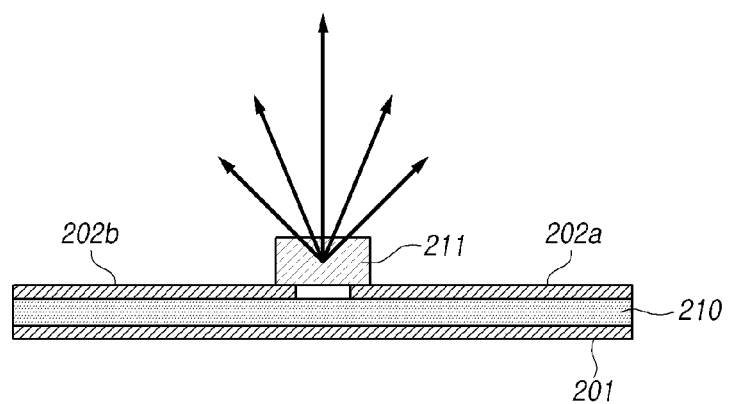
FIG. 13 is a cross-sectional view showing a cross section of a first region on the substrate.
Figure 14:
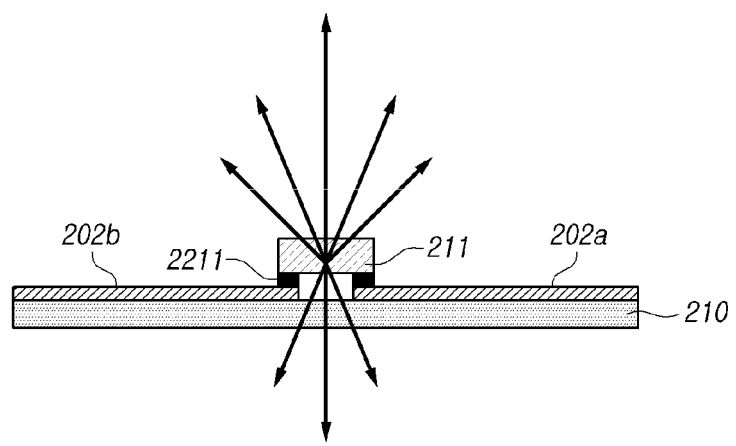
FIG. 14 is a cross-sectional view showing a cross-section of a second region on the substrate.

FIG. 11 is a plan view showing the embodiment in which a plurality of lines are arranged on the rear surface of the substrate according to the present disclosure, FIG. 12 is a plan view showing the occurrence of the light leakage on the back surface of the substrate, FIG. 13 is a cross-sectional view showing a cross section of a first region on the substrate, and FIG. 14 is a cross-sectional view showing a cross-section of a second region on the substrate.

Referring to FIGS. 11 to 14, a plurality of first wirings or lines 202a and 202b may be disposed on the front surface of the substrate 210, and a plurality of second wirings or lines 201 may be disposed on the rear surface of the substrate 210. The plurality of first lines 202a and 202b may include the first pattern 202a and the second pattern 202b, and the light emitting element 211 may be disposed on the first pattern 202a and the second pattern 202b. The electrode unit 2211 of the light emitting element 211 may be disposed on the first pattern 202a and the second pattern 202b.

The electrode unit 2211 of the light emitting element 211 may receive voltages of different polarities through the first pattern 202a and the second pattern 202b to allow current to flow. The first pattern 202a and the second pattern 202b may be arranged with a predetermined distance (or a selected distance) from each other so as not to be short-circuited. In addition, the second line 201 may be formed by patterning the conductive layer disposed on the rear surface of the substrate 210. The second line 201 may be disposed at a specific position on the back surface of the substrate 210 due to the position of the elements disposed on the front surface of the substrate 201 or the flexible film connected to the substrate 210. In addition, when the length of the line becomes long, a problem may arise in which the line resistance increases, so that the position of the second lines 210 may not be changed as desired. Accordingly, the rear surface of the substrate 210 may be divided into a first region A1 through which the second line 201 passes and a second region A2 through which the second line 201 does not pass. The first lines 202a and 202b and the second line 201 disposed on the front and rear surfaces of the substrate 210 may include copper, however, is not limited thereto. The first lines 202a and 202b and the second line 201 disposed on the substrate 210 may not transmit light.

Accordingly, the light leakage LF may occur in the second region A2, however, the light leakage LF may not occur in the first region A1. In FIG. 12, the first region A1 and the second region A2 are illustrated as areas having a rectangular shape, but this is for convenience of description, and the first region A1 is a part of the region where the light leakage LF is not generated on the rear surface of the substrate 210 and the second region A2 is a part of the region where the light leakage LF is generated on the rear surface of the substrate 210.

In addition, a Zener diode 211z may be disposed on the rear surface of the substrate 210 to prevent the reverse voltage from being applied to the light emitting element 211.

Since the light emitting element 211 disposed on the front surface of the substrate 210 has the flip chip structure and can be directly mounted on the substrate 210, the light emitted from the light emitting element 211 may also be emitted in the direction of the substrate 210. The light emitted in the direction of the substrate 210 may pass through the substrate 210.

The rear surface of the substrate 210 is divided into the first region A1 and the second region A2, and as shown in FIG. 13, the light emitted from the light emitting element 211 disposed on the first region A1 may be blocked by the second line 201 disposed under the first region A1. However, since the second line 201 is not disposed under the second region A2, light emitted from the light emitting element 211 may not be blocked.

Therefore, in the first region A1, light transmitted through the substrate 210 may be reflected by the second line 201 and can be emitted to the front surface of the substrate 210, so that the light leakage may not appear in the first region A1 of the rear surface of the substrate 210. However, the light leakage may appear in the second region A2. In addition, in the first region A1, since light emitted to the front surface of the substrate 210 may be added by the second line 201, the difference may occur in the intensity of light emitted to the front surface of the substrate 210 between the first region A1 and the second region A2. As a result, the second region A2 may be relatively darker than the first region A1, and accordingly, there may be a problem that the brightness is not uniform on the front surface of the backlight unit 200.

Figure 15:
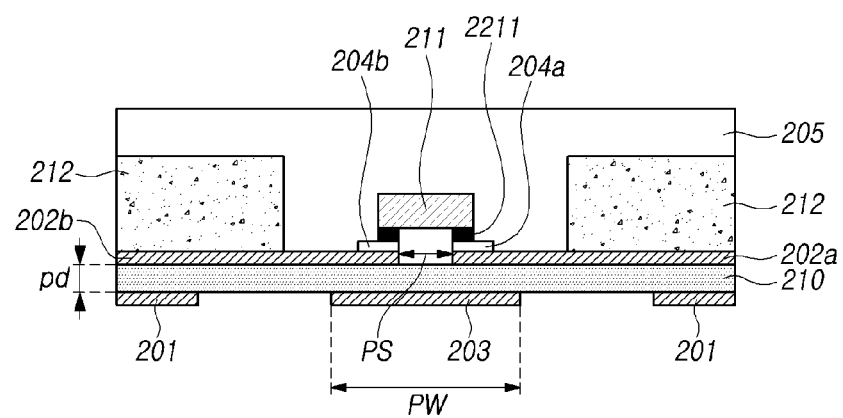
FIG. 15 is a cross-sectional view illustrating the dummy pattern disposed on the rear surface of the substrate according to the present disclosure.
Figure 16A:
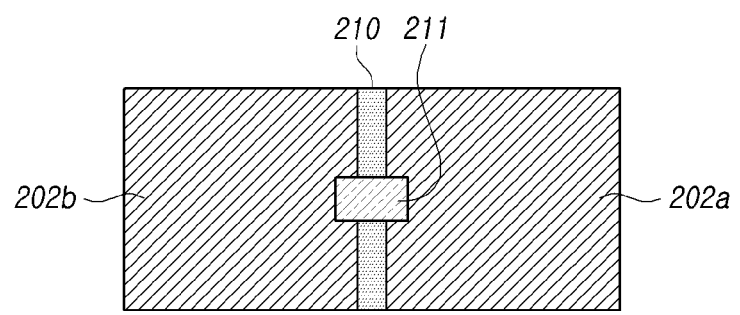
FIGS. 16A and 16B are plan views illustrating the dummy pattern disposed on the rear surface of the substrate according to the present disclosure.
Figure 16B:
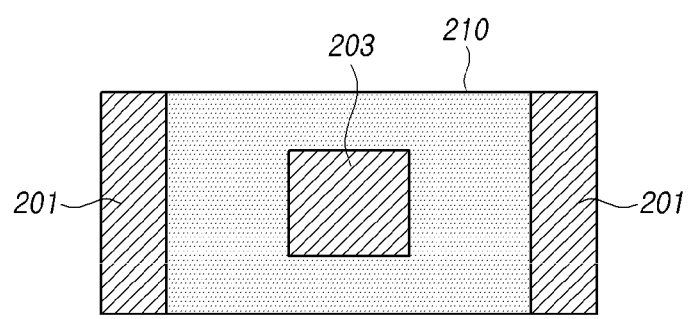

FIG. 15 is a cross-sectional view illustrating the dummy pattern disposed on the rear surface of the substrate according to the present disclosure, and FIGS. 16A and 16B are plan views illustrating the dummy pattern disposed on the rear surface of the substrate according to the present disclosure.

Referring to FIGS. 15, 16A and 16B, the dummy pattern 203 may be disposed on the rear surface of the substrate 210. The dummy pattern 203 may include copper, however, is not limited thereto, and the dummy pattern 203 may be formed of the same material (or substantially the same material) as the second line 201. The dummy pattern 203 may be disposed on the rear surface of the substrate 210 in the floating state, so that the second line 201 may not be affected by the dummy pattern 203.

As shown in FIG. 16A, first patterns 202a and second patterns 202b spaced apart from each other may be disposed on the upper surface of the substrate 210 to supply power. In addition, one of a plurality of light emitting elements may be disposed on the first pattern 202a and the second pattern 202b. Further, as illustrated in FIG. 16B, the dummy pattern 203 may be disposed in an area overlapping at least one of the plurality of light emitting elements 211 disposed in the second region A2.

Accordingly, the occurrence of light leakage on the rear surface of the substrate 210 may be suppressed by the dummy pattern 203. Here, the dummy pattern 203 is illustrated as having the quadrangular shape, but is not limited thereto.

In addition, the width DW of the dummy pattern 203 may correspond to the separation distance PS between the first pattern 202a and the second pattern 202b disposed on the substrate 210 and the thickness pd of the substrate 210. That is, if the separation distance PS between the first pattern 202a and the second pattern 202b or the thickness of the substrate 210 is large, the width of the dummy pattern 203 may also be greater. That is, the width of the dummy pattern 203 may be proportional to the separation distance PS or the thickness pd of the substrate.

The light emitting element 211 may be fixed on the first pattern 202a and the second pattern 202b by solder resistors 204a and 204b.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A backlight unit, comprising:
   a substrate;
   a plurality of light emitting elements disposed on the substrate;
   a first reflector disposed on the substrate and including a plurality of holes, one of the plurality of light emitting elements being disposed in each hole;
   a light conversion sheet disposed on the substrate and having a light conversion pattern disposed at a position overlapping the light emitting element; and
   a phosphor sheet having a first phosphor disposed on the substrate,
   wherein a size of first light emitting elements disposed on the edge of the substrate among the plurality of light emitting elements is larger than a size of second light emitting elements disposed in the center of the substrate.

2. The backlight unit of claim 1, wherein a color resin having a second phosphor is further disposed on a light emitting surface of the first light emitting element.

3. The backlight unit of claim 2, wherein the first phosphor and the second phosphor have the same or substantially the same color.

4. The backlight unit of claim 1, wherein a dummy pattern is disposed on a rear surface of the substrate at a position overlapping at least one of the plurality of light emitting elements.

5. The backlight unit of claim 4, wherein a first pattern and a second pattern spaced apart from each other on an upper surface of the substrate are disposed to supply power,
   one of the plurality of light emitting elements is connected to the first pattern and the second pattern,
   a width of the dummy pattern corresponds to the distance between the first pattern and the second pattern, and a thickness of the substrate.

6. The backlight unit of claim 4, wherein a plurality of lines are disposed on a rear surface of the substrate, the plurality of lines are disposed in a portion of a region overlapping the plurality of light emitting elements, and the dummy pattern is disposed in another portion of a region where the plurality of lines are not disposed among the region overlapping the plurality of light emitting elements.

7. The backlight unit of claim 1, wherein the light conversion pattern adjusts an emission direction of light emitted from the light emitting element.

8. The backlight unit of claim 1, wherein the light conversion pattern is formed such that a central portion of the light conversion pattern is the thickest.

9. The backlight unit of claim 1, wherein the light conversion pattern includes titanium dioxide ($TiO_2$).

10. The backlight unit of claim 1, further comprising a diffusion plate disposed between the light conversion sheet and the phosphor sheet.

11. A display device comprising:
    a display panel; and
    a backlight unit disposed under the display panel and emitting light to the display panel,
    wherein the backlight unit includes:
    a substrate;
    a plurality of light emitting elements disposed on the substrate;
    a first reflector disposed on the substrate and including a plurality of holes, one of the plurality of light emitting elements being disposed in each hole;
    a light conversion sheet disposed on the substrate and having a light conversion pattern disposed at a position overlapping the light emitting element; and
    a phosphor sheet having a first phosphor disposed on the substrate,
    wherein a size of first light emitting elements disposed on the edge of the substrate among the plurality of light emitting elements is larger than size of second light emitting elements disposed in the center of the substrate.

12. The display device of claim 11, wherein a color resin having a second phosphor is further disposed on a light emitting surface of the first light emitting element.

13. The display device of claim 12, wherein the first phosphor and the second phosphor have the same or substantially the same color.

14. The display device of claim 11, wherein a dummy pattern is disposed on a rear surface of the substrate at a position overlapping at least one of the plurality of light emitting elements.

15. The display device of claim 14, wherein a first pattern and a second pattern spaced apart from each other on an upper surface of the substrate are disposed to supply power,
    one of the plurality of light emitting elements is connected to the first pattern and the second pattern,
    a width of the dummy pattern corresponds to the distance between the first pattern and the second pattern, and a thickness of the substrate.

16. The display device of claim 14, wherein a plurality of lines are disposed on a rear surface of the substrate, the plurality of lines are disposed in a portion of a region overlapping the plurality of light emitting elements, and the dummy pattern is disposed in another portion of a region where the plurality of lines are not disposed among the region overlapping the plurality of light emitting elements.

17. The display device of claim 11, wherein the light conversion pattern adjusts an emission direction of light emitted from the light emitting element.

18. The display device of claim 11, wherein the light conversion pattern is formed such that a central portion of the light conversion pattern is the thickest.

19. The display device of claim 11, wherein the light conversion pattern includes titanium dioxide ($TiO_2$).

20. The display device of claim 11, further comprising a diffusion plate disposed between the light conversion sheet and the phosphor sheet.

* * * * *